United States Patent [19]

Schnurrbusch et al.

[11] 3,803,084

[45] Apr. 9, 1974

[54] PROCESS FOR THE PRODUCTION OF HIGH-POLYMER ORGANO-SILOXANES

[75] Inventors: Karl Schnurrbusch, Leverkusen; Rudolf Erdmenger; Wilfried Kniege, both of Bergisch Gladbach, all of Germany

[73] Assignee: Bayer AG, Leverkusen, Germany

[22] Filed: Jan. 28, 1972

[21] Appl. No.: 221,792

Related U.S. Application Data

[63] Continuation of Ser. No. 798,971, Feb. 13, 1969, abandoned.

[30] Foreign Application Priority Data

Mar. 23, 1968  Germany............................ 1770048

[52] U.S. Cl..................... 260/46.5 G, 259/7, 259/8, 259/23, 259/43, 259/44, 259/66, 259/67, 259/107, 259/108, 260/37 SB, 260/46.5 R
[51] Int. Cl.........................................C08f 11/04
[58] Field of Search........................260/46.5 R, 260/46.5 G; 259/7, 8, 23, 43, 44, 66, 67, 260/107, 108

[56] References Cited
UNITED STATES PATENTS

| 3,175,995 | 3/1965 | Elliott et al. | 260/46.5 |
|---|---|---|---|
| 3,183,205 | 5/1965 | Bailey et al. | 260/37 |

OTHER PUBLICATIONS

Mead, Encyclopedia of Process Equipment, (1964), pp. 643 to 645.

*Primary Examiner*—Donald E. Czaja
*Assistant Examiner*—Melvyn I. Marquis
*Attorney, Agent, or Firm*—Burgess, Dinklage & Sprung

[57] ABSTRACT

In the production of high polymer polyorgano-siloxane convertible to silicone elastomers, oligomeric organo-siloxanes and catalyst are stirred in an upright container. The stirring is effected with a spiral stirrer disposed along the wall of the container, while the center of the container is free of conveyor means for free axial flow of the polymerizing material therethrough.

8 Claims, 1 Drawing Figure

PATENTED APR 9 1974
3,803,084
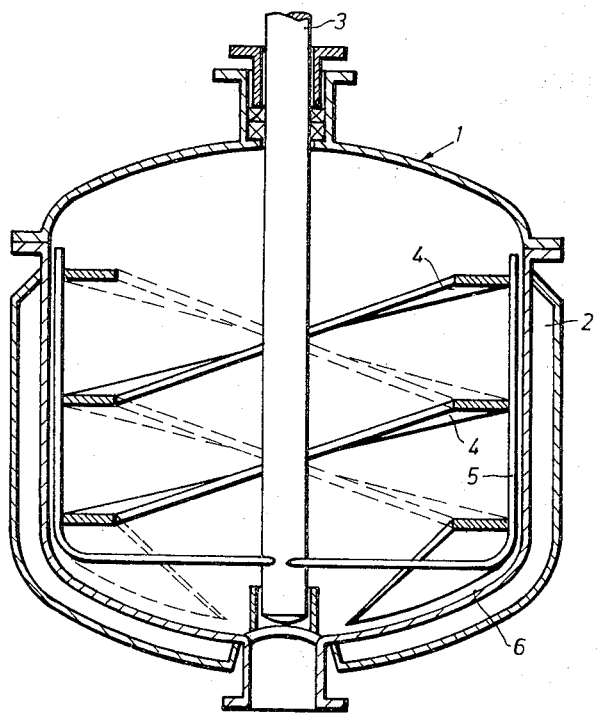
INVENTORS:
KARL SCHNURRBUSCH, RUDOLF ERDMENGER, WILFRIED KNIEGE.
BY
Burgess, Dinklage & Sprung

PROCESS FOR THE PRODUCTION OF HIGH-POLYMER ORGANO-SILOXANES

This is a continuation of application Ser. No. 798,971 filed Feb. 13, 1969, now abandoned.

It is known that high molecular poly-diorganosiloxanes are required for the production of silicone elastomers. They are based on chain-polymer poly-dimethylsiloxanes of molecular weights between 300,000 and 500,000 (W. Noll, Chemie and Technologie der Silicone, Verlag Chemie, Weinheim, 1960, p. 244). In order to obtain such high polymers, pure bifunctional monomers or oligomers must be used as starting materials. Traces of trifunctional components lead to branching which decisively affects the subsequent processing of the high polymer as well as the properties of the silicone rubber mixtures produced therefrom. This is true to an even greater extent when methyl groups are increasingly substituted in the high-polymer polydimethyl-siloxane by other organo groups, for example, alkenyl, fluoroalkyl, cyanoalkyl, aryl etc., or also by hydrogen.

For achieving optimum properties in the production of the high polymer poly-diorgano-siloxane, not only strict linearity of the polysiloxane chain is required, but, in addition, in a very decisive manner, constant reaction conditions for example, temperature, concentration of catalyst and the additives, should be observed. In order to create and to maintain the conditions which are important for the reaction process described, i.e., areas of temperature and concentration as homogeneous as possible in the apparatus, changes in these conditions must be accommodated. It is therefore necessary to enforce a strong convection of substance, and this is very difficult in the present case because of the absence of turbulence in these viscous liquids. It is necessary to keep the lumps of material in a circulating motion everywhere in the apparatus by means of a suitable stirring device and to entangle the laminar currents in as many ways as possible.

It is known that so-called spiral stirrers operate in viscous liquids in the sense described above. They consist of a peripheral spiral which is comparatively narrow and scrapes off the liquid present in the vicinity of the container wall, conveying it upwards or downwards, and of a second spiral or worm which is mounted on the stirrer shaft and moves the liquid present in the vicinity of the container axle in the opposite direction. These spiral stirrers do not have the desired thorough mixing effect which is required in order to obtain a good product.

Surprisingly, it has now been found that for the production of high-polymer organo-siloxanes from oligomeric organo-siloxanes in the presence of catalysts and optionally of further additives, as well as for the after-treatment of such high-polymer organo-siloxanes for the purpose of their stabilisation or for driving off volatile components, it is possible according to the invention to use a stirrer container with spiral stirrer, this spiral stirrer having a single peripheral, optionally multiple-thread spiral which is substantially adapted to the wall of the container.

This stirrer used according to the invention leads to a substantially faster mixing than the stirrers previously used where the viscous liquid adhered to the centrally arranged spiral or worm in spite of its conveyer effect, thus braking or preventing the circulation. By contrast, the spiral stirrer used according to the invention ensures a free axial flow and an improved circulation of the liquid. Due to the invention, it is now possible to obtain polyorgano-siloxanes which impart improved properties to the silicone rubber mixtures and vulcanisation products prepared therefrom, as will be shown by means of examples. It is therefore understandable that by the use of the new spiral stirrer described above for after-treatment, it is also possible to achieve a very good stabilisation of known catalyst-containing polyorganosiloxanes, such as are described for example, in U.S. Pat. Nos. 2,714,099; 2,717,902; 2,739,952 and 2,789,109. This applies also to the removal of volatile low-molecular components from high-polymer organo-siloxanes.

A stirrer container with the spiral stirrer used according to the invention in a form serving as example, is illustrated and explained in detail with the aid of a drawing:

In the stirrer container 1 which is surrounded by the tempering jacket 2, a two-thread peripheral spiral 4 rotates with the stirrer shaft 3; the spiral is fixed to the supporting frame 5 and its outer contour corresponds to the wall 6 of the stirrer container 1.

EXAMPLE 1

99.75 percent by weight octamethylcyclotetrasiloxane and 0.25 percent by weight tetramethyl-tetravinylcyclotetrasiloxane were polymerised in known manner with 0.001 per cent by weight potassium hydroxide at 160° C until the viscosity amounted to $10^7$ cSt at 20° C.

The polymer A was prepared in a conventional polymerisation vessel and a reaction time of 7 hours was necessary. The polymer B was prepared in the same polymerisation vessel, but after installing the stirrer system according to the invention. The polymerisation time amounted only to 5 hours.

100 Parts by weight of each polymer were mixed with 30 parts by weight of a commercial finely highly reinforcing fumed silica and 0.4 parts by weight dicumyl peroxide on conventional mixing rolls, and stored at room temperature. In mixtures which contain finely reinforcing silicas filler, a hardening will usually be observed during storage, and this may render further processing more difficult. A measure of this undesirable tendency to harden is the so-called re-milling time, i.e., the time, measured in minutes, which is required in order to process a certain amount of mixture on rubber mill so that the plasticity of the mixture before storage is again achieved.

300 g of each of the two mixtures were therefore re-milled on laboratory rubber-mill after certain periods of storage and the time required for this purpose was measured.

| Storage time | Re-milling Polymer A | time as (min.) of the mixtures with Polymer B |
|---|---|---|
| 2 | 2 | 1.5 |
| 4 | 4 | 2.5 |
| 8 | 6 | 4 |
| 16 | 9 | 6 |
| 32 | 12 | 6 |
| 48 | 12 | 6 |

From the materials which had been stored for 48 days prior to re-milling tubes of the dimensions 5 x 1.5 mm were produced with a conventional extruder. The mixture with polymer A permitted of an injection rate of 16 m/minute. The mixture containing polymer B permitted of an extrusion speed of 23 m/minute and, moreover, yielded tubes with an absolutely smooth surface, whereas the polymer A yielded a slightly wavy surface.

EXAMPLE 2

91.7 per cent by weight octamethyl-cyclotetrasiloxane, 8.0 percent by weight octaphenyl-cyclotetrasiloxane and 0.3 per cent by weight tetramethyl-tetravinyl-cyclotetrasiloxane were polymerised each time with 0.002 per cent by weight KOH at 160° C until the viscosity amounted to $10^6$ cSt at 20° C. The polymer C was prepared in analogy with polymer A (Example 1) and the polymer D in analogy with polymer B (Example 1).

100 Parts by weight of each polymer were mixed with 38 parts by weight of finely disperse silicic acid, 12 parts by weight diatomaceous earth, 2 parts by weight zinc oxide, 4 parts by weight diphenyl-silane-diol, 8 parts by weight iron oxide and 0.7 parts by weight 1,4-bis-(tert.-butyl-peroxyisopropyl)-benzene.

For conversion into elastomers, the mixtures were precured in conventional manner in a vulcanising press at 160° C for 8 minutes and subsequently finished by storing them in hot air at 200° C for 6 hours.

When tested, the elastomers thus obtained gave the following values

| Properties | Elastomers with the use of | |
| --- | --- | --- |
| | Polymer C | Polymer D |
| Tensile strength (kg/sq.cm) | 62 | 75 |
| Elongation at break (%) | 270 | 315 |
| Hardness (Shore A) | 65 | 65 |
| Rebound resilience (%) | 36 | 39 |

EXAMPLE 3

The polymers A and B described in Example 1 were produced several times. It was obvious, that certain divergences occurred in respect of the viscosity, in spite of the unchanged polymerisation conditions. The evaluation of 45 polymers of the type A and 45 polymers of the type B gave the following results:

| | Polymer A | Polymer B |
| --- | --- | --- |
| Desired viscosity (cSt) | $1 \cdot 10^7$ | $1 \cdot 10^7$ |
| Average values (cSt) | $2 \cdot 10^7$ | $1 \cdot 10^7$ |
| Range of divergence (cSt) | $4 \cdot 10^5$ to $5 \cdot 10^9$ | $7 \cdot 10^6$ to $3 \cdot 10^7$ |

The advantages obtained with regard to homogeneity and reproducibility when working according to the process of the invention are clearly demonstrated by the narrow range of divergence.

The same advantages of the process according to the invention are found when the polymerisation is carried out, for example, with sulphuric acid or phosphorus pentoxide. When working according to the process of the invention, the content of components which are volatile at below 180° C, due mainly to non-copolymerized starting materials of the type of octamethyl-cyclotetrasiloxane, was, on average, by about 25 percent lower than that encountered when working according to the previous process.

What is claimed is:

1. In the process of production of high polyorganosiloxane convertible to silicon elastomers, by polymerization of oligomeric organo-siloxane in the presence of a catalyst for the polymerization, in a container, wherein the oligomeric organo-siloxane is stirred during the polymerization to impart uniformity of the polymerization reaction, the improvement which comprises effecting said stirring in an upright container having a vertically disposed axis and an upwardly extending side wall, with a single peripheral spiral stirrer conforming to the wall of the container and disposed along and adjacent thereto and mounted by a frame on a rotatable shaft disposed axially in the container, for rotation with the shaft, the inwardly disposed periphery of the spiral stirrer being disposed adjacent the container wall leaving the center of the container free of conveyor means for free axial flow of the polymerizing material therethrough, said stirring being effected by rotating the stirrer in the container.

2. Process according to claim 1, the oligomeric organo-siloxanes being bifunctional.

3. Process according to claim 1, the oligomeric organo-siloxane being octamethyl-cyclotetrasiloxane.

4. In the treatment of high polymer polyorgano siloxane for stabilzation thereof or driving off volatile components therefrom, the improvement which comprises effecting said stirring in an upright container having a vertically disposed axis and an upwardly extending side wall, with a single spiral stirrer conforming to the wall of the container and disposed along and adjacent thereto and mounted by a frame on a rotatable shaft disposed axially in the container, for rotation with the shaft, the inwardly disposed periphery of the spiral stirrer being disposed adjacent the container wall leaving the center of the container free of conveyor means for free axial flow of the poly siloxane therethrough, said stirring being effected by rotating the stirrer in the container.

5. Process according to claim 1, said oligomeric organo-siloxane being octamethyl-cyclotetra-siloxane, and said catalyst being potassium hydroxide.

6. Process according to claim 4, said high polymer polyorgano siloxane being a polymer of octamethyl-cyclotetra-siloxane.

7. Process according to claim 1, said single spiral stirrer being a multiple thread spiral.

8. Process according to claim 4, said single spiral stirrer being a multiple thread spiral.

* * * * *